(12) United States Patent
Baerwolff et al.

(10) Patent No.: US 8,080,804 B2
(45) Date of Patent: Dec. 20, 2011

(54) ARRANGEMENT WITH A MEDICAL GAMMA DETECTOR, OPTICAL MODULE AND KIT

(75) Inventors: Harmut Baerwolff, Gummersbach (DE); Thomas Goebel, Berlin (DE); Olaf Hug, Berlin (DE)

(73) Assignee: First Sensor AG, Berlin (DE)

( * ) Notice: Subject to any disclaimer, the term of this patent is extended or adjusted under 35 U.S.C. 154(b) by 0 days.

(21) Appl. No.: 12/300,905

(22) PCT Filed: May 11, 2007

(86) PCT No.: PCT/DE2007/000873
§ 371 (c)(1),
(2), (4) Date: Mar. 23, 2009

(87) PCT Pub. No.: WO2007/131485
PCT Pub. Date: Nov. 22, 2007

(65) Prior Publication Data
US 2009/0266993 A1    Oct. 29, 2009

(30) Foreign Application Priority Data

May 16, 2006 (DE) .................. 10 2006 023 080

(51) Int. Cl.
*H01L 27/146* (2006.01)
(52) U.S. Cl. .................................... 250/370.09
(58) Field of Classification Search .............. 250/302, 250/303, 361 R, 362, 368, 369, 370.01–370.15, 250/363.01–363.1
See application file for complete search history.

(56) References Cited

U.S. PATENT DOCUMENTS

| 5,088,492 A * | 2/1992 | Takayama et al. ............ 600/431 |
| 6,643,538 B1 * | 11/2003 | Majewski et al. ............. 600/436 |
| 2006/0049351 A1 * | 3/2006 | Bushberg et al. .......... 250/336.1 |

FOREIGN PATENT DOCUMENTS

EP    999457 A1 *    5/2000

* cited by examiner

*Primary Examiner* — Kiho Kim
(74) *Attorney, Agent, or Firm* — Sutherland Asbill & Brennan, LLP

(57) ABSTRACT

The invention relates to an arrangement with a medical gamma probe and an optical module arranged on the medical gamma probe, said optical module having a light source which emits light rays during operation and is configured to generate an optical pointer in a detection region of the medial gamma probe using the light rays from the light source.

10 Claims, 1 Drawing Sheet

ARRANGEMENT WITH A MEDICAL GAMMA DETECTOR, OPTICAL MODULE AND KIT

CROSS-REFERENCE TO RELATED APPLICATION

This is a submission pursuant to 35 U.S.C. 154(d)(4) to enter the national stage under 35 U.S.C. 371 for PCT/DE2007/000873 filed May 11, 2007. Priority is claimed under 35 U.S.C. 119(a) and 35 U.S.C. 365(b) to German Patent Application No. 102006023080.9 filed May 16, 2006. The subject matters of PCT/DE2007/000873 and German Patent Application No. 102006023080.9 are hereby expressly incorporated herein by reference.

The invention relates to an arrangement with a medical gamma probe, an optical module for a medical gamma probe and a construction kit with a medical gamma probe and an optical module.

BACKGROUND OF THE INVENTION

Radioactive marking of the first draining lymph nodes (sentinel nodes) during an operation on malignant melanoma (skin cancer) and mammary carcinoma and some cancer types in the neck and abdominal regions has become a standard method in medical practice. Radioactively labelled tumour-specific pharmaceuticals are also gaining importance due to the high spatial resolution that can be expected when directly locating cancerous tissue. The quality and duration of the search for lymph nodes or tumours depends absolutely on the technical properties and handling of the gamma probes employed for locating the radioactively marked tissue regions.

The finding of radioactively marked lymph nodes with the aid of known gamma probes is usually carried out by means of a spatially-resolving activity measurement. Herein, the spatial allocation and therefore ultimately the locating of the lymph node is usually made in the region of the activity maximum by means of an imaginary projection of the probe centre into the tissue region. Depending on the probe diameter and the experience of the physician in using a particular probe type, this leads to subjective measuring errors which can make the finding of the node more difficult, delay it or, in extreme cases, even prevent it. Direct display of the tissue section being sought does not take place.

SUMMARY OF THE INVENTION

It is an object of the invention to provide improved techniques for a medical gamma probe with which the ease of operation of the medical gamma probe by a user is improved. It is also intended to avoid disadvantages of conventional gamma probe technology.

The aim is achieved with an arrangement comprising a medical gamma probe and an optical module arranged on the medical gamma probe, said optical module comprising a light source which emits light rays during operation and is configured to generate an optical pointer in a detection region of the medial gamma probe using the light rays from the light source. In another embodiment, the present invention provides an optical module for a medical gamma probe comprising a light source which emits light rays in operation. said optical module being configured for detection-side mountin on the medical.robe such that an optical pointer is provided in a detection region of the dical amrna probe us in the light rays from the light source. In yet another embodiment, the present invention provides a construction kit comprising a medical gamma probe and an optical module capable of detection-side mounting on the medical gamma probe, said optical module comprising a light source which emits light rays in operation and is configured to provide an optical pointer in a detection region of the medical gamma probe using the light rays from the light source.

The invention includes the concept of providing an optical module for a medical gamma probe, said module comprising a light source emitting light rays in operation and being configured to provide an optical pointer in a detection region of the medical gamma probe using the light rays from the light source. By this means, it is made possible for the user of the gamma probe to mark optically a section of tissue to be investigated, in that the optical light pointer which is provided with the aid of the optical module points thereto.

A preferred embodiment of the invention provides that the optical module is detachably mounted on the medical gamma probe. The detachability of the optical module can be achieved, for example, with a plug-in connection or a screw connection.

In a suitable embodiment of the invention, it can be provided that the optical module is integrated in a housing of the medical gamma probe. By this means, a unified housing can be provided. In this embodiment, also, detachable mounting of the optical module is possible, for example, by means of a removable or openable housing section which permits detaching or mounting of the optical module. In particular, a housing section can be configured to be pivotable.

An advantageous embodiment of the invention provides that the light source is arranged in a central region of a collimator. This reduces the effort required for central guidance of the light rays emitted by the light source, since the light source itself is already positioned in the central region of the collimator. With this embodiment, a concentric distribution of the light rays about the central region of the collimator is enabled particularly easily.

Preferably, a modification of the invention provides that the optical module is constructed in an additional collimator placed on the medical gamma probe. The additional collimator can be plugged or screwed onto a detection-side end of the medical gamma probe. But other types of fastening of the additional collimator to the medical gamma probe can also be provided, in particular also for retrofitting the additional collimator.

It can be provided in an advantageous embodiment of the invention that the optical module comprises one or more optical elements which are configured to conduct and, optionally, to alter the light rays. A change in the light rays can comprise, in particular, focusing or scattering of the light rays or a combination thereof.

It can be provided in a development of the invention that the one or more optical elements are configured to guide the light rays essentially collinear with the longitudinal axis of a gamma probe tip of the medical gamma probe. In general, medical gamma probes are configured such that a preferred detection direction is arranged essentially collinear with the longitudinal extent of the probe.

A preferred development of the invention provides a light source control device which is configured to modulate a light intensity of the light rays emitted by the light source according to an activity detected by the medical gamma probe. The light source control device can be configured such that the light intensity output by the light source is set to be proportional to the detected activity, wherein naturally a suitable proportionality factor can be used.

In a suitable embodiment of the invention, it can be provided that the light source is constructed with one or more light emitting diodes (LEDs) or one or more laser diodes. A combination of light emitting diodes and laser diodes can also be provided. The diodes preferably have a focused beam, a high quantum efficiency and/or a long working life. In a possible embodiment adjustment to the spectral sensitivity curve of the human eye is provided in that a light source is used which emits light in a spectral region in which the human eye is particularly sensitive, in particular green light.

DESCRIPTION OF PREFERRED EMBODIMENTS OF THE INVENTION

The invention will now be described in greater detail using exemplary embodiments and making reference to the drawings, in which:

FIG. 1 shows a schematic representation of a head-side or detection-side section 20 of a medical gamma probe with, constructed therein, an optical module 4, which can also be designated an optical light pointer module, so that a light ray-assisted gamma probe is created. The medical gamma probe can have essentially any configuration.

Figure 1:
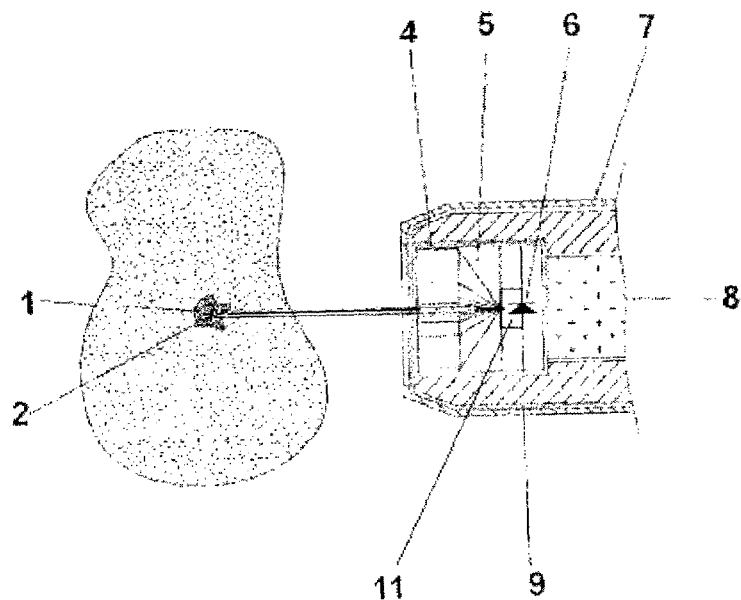
FIG. 1 shows a schematic representation of a head-side section of a medical gamma probe with, constructed therein, an optical module

The optical module 4 enables the creation of an optical pointer. For this purpose, the optical module 4 has one or more light sources 6 and associated optical elements 5 in order to conduct and optionally influence, for example, focus light rays emitted by the light source 6. As the light source 6, in particular, a high output light-emitting diode or a laser diode can be provided. The optical pointer enables direct indication of a tissue section 1 that is radioactively marked. During the activity measurement with the medical gamma probe, the tissue region 1 with the maximum activity can be directly marked optically. The light source control device 11 can be configured such that the light intensity output by the light source is set to be proportional to the detected activity, wherein naturally a suitable proportionality factor can be used.

The optical module 4 is arranged in the region of a probe head 21 which comprises a collimator 9 and a scintillation detector 8. In the embodiment according to FIG. 1, the optical module 4 is firmly mounted on a housing 7 of the medical gamma probe 20. This mounting may be externally on the housing 7 or, as FIG. 1 shows, by integration in the collimator 9. The light source 6 is arranged in the central region of the collimator 9. The light rays emitted by the light source 6 form a marking light spot 2 in the centre of the highest activity on the tissue section 1, so that a tissue removal point is indicated directly and precisely to the user.

The form of the light spot 2 is determined by the associated optical element 5 and is preferably a cross, a circle (see FIG. 2), a point or a combination of these or other geometries. With the aid of a circular light spot, a distance-dependent and also circular sensitivity region of a measuring window of the medical gamma probe can also be projected onto the tissue section, so that a whole tissue region that contributes to an actual measured value of the medical gamma probe is indicated.

It can be provided for the output light intensity of the light source 6 to be synchronised with an activity measured by the medical gamma probe. For this purpose, the electronic information on the measured activity of the tissue section 1 available in the medical gamma probe is evaluated and, based thereon, associated control signals passed to a light source control device. An electronic circuit that is suitable for this purpose can be integrated in addition to the usual control system of the medical gamma probe without difficulty. The light spot 2 then indicates with maximum intensity the position of a point in the tissue section 1 having maximum activity. The optical display of the maximum activity measured by the medical gamma probe can additionally be supported by the maximum light intensity of the light source 6, by the maximum pulse frequency of the light spot 2, a colour change or a combination thereof. The light source control device 11 can be configured such that the light intensity output by the light source is set to be proportional to the detected activity, wherein naturally a suitable proportionality factor can be used.

The light spot 2 can also directly indicate the position of a measuring region in the tissue section 1, regardless of the activity measured by the gamma probe, either continuously or in pulsed form.

Figure 2:
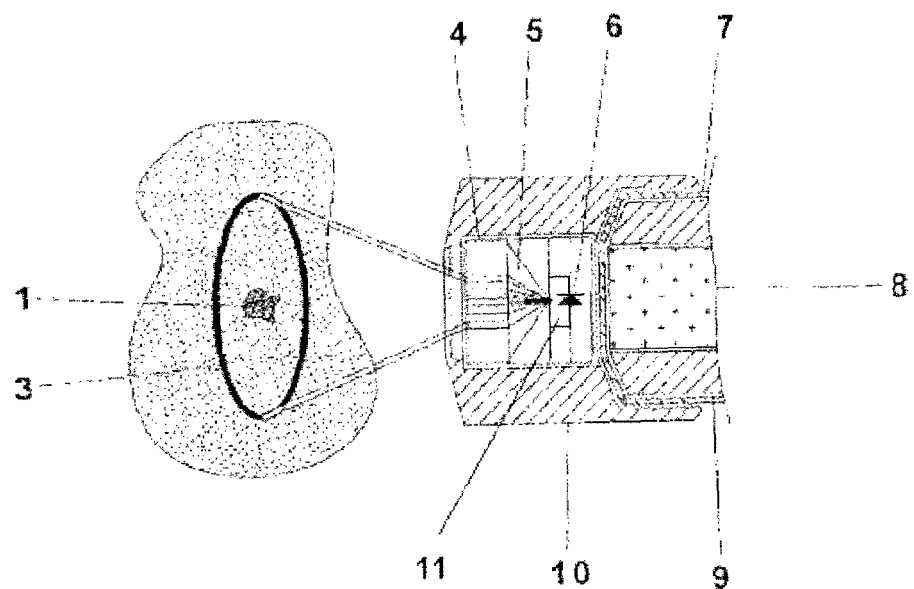
FIG. 2 shows a schematic representation of a head-side section of a medical gamma probe on which an optical module is placed.

FIG. 2 shows a schematic representation of a head-side section 20 of a medical gamma probe on which the optical module 4 is placed. In Fig, 2, the same reference signs are used for the same features as in FIG. 1. As distinct from FIG. 1, a circular light spot 3 is shown. The optical module 4 is formed as an auxiliary component, which is also suitable for retrofitting and, in the exemplary embodiment shown, is integrated into an additional collimator 10 which can be mounted. A freestanding embodiment of the optical module 4 can also be provided so that it can be mounted detachably, for example, by plugging or screwing on.

The features of the invention disclosed in the above description, the claims and the figure, may be significant for the realisation of the invention in its various embodiments either individually or in any combination.

The invention claimed is:

1. An arrangement comprising:
a medical gamma probe;
an optical module arranged on the medical gamma probe, wherein the optical module comprises a light source which emits light rays during operation, and generates an optical pointer in a detection region of the medical gamma probe using the light rays from the light source; and
a light source control device which modulates a light intensity of the light rays emitted by the light source according to an activity detected by the medical gamma probe.

2. The arrangement according to claim 1, wherein the optical module is detachably mounted on the medical gamma probe.

3. The arrangement according to claim 1, wherein the optical module is integrated in a housing of the medical gamma probe.

4. The arrangement according to claim 1, wherein the light source is arranged in a central region of a collimator.

5. The arrangement according to claim 1, wherein the optical module is constructed in an additional collimator placed on the medical gamma probe.

6. The arrangement according to claim 1, wherein the optical module comprises one or more optical elements which conduct and, optionally, alter the light rays.

7. The arrangement according to claim 1 wherein the one or more optical elements guide the light rays substantially collinearly with the longitudinal axis of a gamma probe tip of the medical gamma probe.

8. The arrangement according to claim 1, wherein the light source comprises one or more light emitting diodes or one or more laser diodes.

9. An optical module for a medical gamma probe comprising:
- a light source which emits light rays in operation; and
- a light source control device which modulates a light intensit of the light rays emitted by the light source according to an activity detected by a medical gamma probe, wherein the optical module is detection-side mountable on the medical gamma probe such that an optical pointer is provided in a detection region of the medical gamma probe using the light rays from the light source.

10. A construction kit comprising:
- a medical gamma probe;
- an optical module that is detection-side mountable on the medical gamma probe, wherein the optical module comprises a light source which emits light rays in operation, provides an optical pointer in a detection region of the medical gamma probe using the light rays from the light source; and
- a light source control device which modulates a light intensity of the light rays emitted by the light source according to an activity detected by the medical gamma probe.

* * * * *

UNITED STATES PATENT AND TRADEMARK OFFICE
CERTIFICATE OF CORRECTION

| | | |
|---|---|---|
| PATENT NO. | : 8,080,804 B2 | Page 1 of 1 |
| APPLICATION NO. | : 12/300905 | |
| DATED | : December 20, 2011 | |
| INVENTOR(S) | : Harmut Baerwolff | |

It is certified that error appears in the above-identified patent and that said Letters Patent is hereby corrected as shown below:

IN THE SPECIFICATIONS:

At column 1, line 64, after "detection-side" delete "mountin" and insert --mounting--.

At column 1, line 65, after "on the" delete "medical.robe" and insert --medical gamma probe--.

At column 1, line 66, after "of the" delete "dical amrna probe us in" and insert --medical gama probe using--.

IN THE CLAIMS:

At column 5, claim 9, lines 7-8, after "light" delete "inten-sit" and insert --intensity--.

Signed and Sealed this
Twenty-seventh Day of March, 2012

David J. Kappos
*Director of the United States Patent and Trademark Office*